US008699496B2

(12) United States Patent  
Klatt et al.

(10) Patent No.: US 8,699,496 B2  
(45) Date of Patent: Apr. 15, 2014

(54) METHOD FOR GUARANTEEING THE QUALITY OF SERVICES IN PACKET-SWITCHING WIRELESS NETWORKS

(75) Inventors: Axel Klatt, Köln (DE); Stefan Koppenborg, Bottrop (DE); Frank Lehser, Bonn (DE); Karl-Heinz Nenner, Bornheim (DE)

(73) Assignee: T-Mobile International AG & Co. KG, Bonn (DE)

( * ) Notice: Subject to any disclaimer, the term of this patent is extended or adjusted under 35 U.S.C. 154(b) by 697 days.

(21) Appl. No.: 12/191,903

(22) Filed: Aug. 14, 2008

(65) Prior Publication Data

US 2009/0040966 A1     Feb. 12, 2009

Related U.S. Application Data

(63) Continuation of application No. PCT/EP2007/001154, filed on Feb. 12, 2007.

(30) Foreign Application Priority Data

Feb. 14, 2006  (DE) .......................... 10 2006 006 953

(51) Int. Cl.  
  *H04W 72/10*  (2009.01)
(52) U.S. Cl.  
  USPC ... 370/395.21; 370/230; 370/235; 370/395.4; 455/521
(58) Field of Classification Search  
  USPC .................. 370/230, 230.1, 231–235, 310.2, 370/328–339, 349, 395.21, 395.4, 395.41, 370/395.42, 395.43; 455/166.2, 422.1, 455/432.3, 435.3, 452.1, 452.2, 512  
  See application file for complete search history.

(56) References Cited

U.S. PATENT DOCUMENTS

| 6,587,457 | B1 | 7/2003 | Mikkonen | |
|---|---|---|---|---|
| 6,661,780 | B2* | 12/2003 | Li | 370/324 |
| 6,683,853 | B1* | 1/2004 | Kannas et al. | 370/237 |
| 7,006,472 | B1 | 2/2006 | Mikkonen et al. | |
| 2001/0027490 | A1* | 10/2001 | Fodor et al. | 709/238 |
| 2002/0032800 | A1* | 3/2002 | Puuskari et al. | 709/246 |
| 2002/0181448 | A1* | 12/2002 | Uskela et al. | 370/352 |
| 2006/0285497 | A1* | 12/2006 | Miller et al. | 370/236 |

FOREIGN PATENT DOCUMENTS

| WO | 99/51055 | 10/1999 |
|---|---|---|
| WO | 00/13436 | 3/2000 |

OTHER PUBLICATIONS

Wang et al., The CDMA2000 QoS, Sep. 20, 2004, 3GPP.*  
3GPP, CDMA2000 Wireless IP Network Standard: Quality of Service and Header Reduction, Feb. 2006, 3GPP.*  
International Search Report, 3 pages (May 31, 2007).

(Continued)

*Primary Examiner* — Hoon J Chung  
(74) *Attorney, Agent, or Firm* — The Maxham Firm

(57) ABSTRACT

A method for guaranteeing the quality of services in packet-switching radio communications networks. The radio access network (RAN) and the core network (CN) use the quality of service information independently of one another, without signalling individual parameters, in order to guarantee the transmission of packets in the uplink and downlink according to the quality of service. This is achieved exclusively using local settings that have been configured for individual TCLs, permitting a radical reduction in complexity compared to conventional methods. The method is further simplified by the described interlinking of different tasks or the linking of such tasks to an existing data transmission.

15 Claims, 2 Drawing Sheets

(56) References Cited

OTHER PUBLICATIONS

"3rd Generation Partnership Project; Technical Specification Group Services and System Aspects; End-to-end Quality of Service (QoS) concept and architecture (Release 6)"; 53 pages (Oct. 5, 2005).

Ericsson, "Simplfied QoS model by using a class based approach" S2-060050, 3GPP, Jan. 16, 2006 (5 pages).

Examination Report from the Japanese State Intellectual Property Office, dated Apr. 3, 2012 (2 pages).

Examination Report from the Japanese State Intellectual Property Office, dated Nov. 20, 2012 (2 pages).

* cited by examiner

METHOD FOR GUARANTEEING THE QUALITY OF SERVICES IN PACKET-SWITCHING WIRELESS NETWORKS

FIELD OF THE INVENTION

The invention relates to a method for guaranteeing the quality of services in packet-switching wireless networks and in particular includes an alternative method to the quality of service concept used in current $2^{nd}$ and $3^{rd}$ generation digital wireless networks (GSM/UMTS).

BACKGROUND OF THE INVENTION

A terminal (user equipment (UE)) is situated in a cell of a packet-switching wireless network and, after successful registration in the network, is available for data that is to be transmitted. In order to actually start the data transmission, it is necessary to set up a packet-oriented connection to a data transmission unit situated in the core network (CN) of the wireless network. To accomplish this, the UE sends a connection setup request to the network and thus also indicates the desired quality of service for the connection. This explicitly involves a quality of service profile, which describes the technical properties of the packet flow on the connection in the form of a parameter set (for example, data throughput, delay during transmission, prioritization); or implicitly involves the indication of a base profile stored in the network (for example, by subscriber profile), which is also embodied in the form of the above-mentioned parameter set.

The connection setup request is forwarded via the radio access network (RAN) to the CN where first a check as to the permissibility of the requested quality of service and the selection of the base profile is carried out with the aid of parameters of the subscriber profile. After the connection setup request, together with the quality of service possibly adapted in accordance with the subscriber profile, has been forwarded to the data transmission unit, a new check, possibly accompanied by a reduction in the quality of service, is carried out, taking into account internal criteria and optionally also additional external criteria that are obtained through further signaling of the data transmission unit with external decision or service nodes. Once the quality of service has finally been established, a confirmation of the connection setup request is sent back to the requesting UE via the involved nodes of the core network and radio network. Additional signaling in the RAN is carried out in order to establish the required radio channel to the UE. In this case, the RAN can carry out a new reduction of the quality of service (for example, for lack of resources), so that new signaling of this to the data transmission unit occurs. Once the connection setup has finally been accepted by all of the involved nodes, it is possible to start the data transmission to and from the UE, it being possible to both sequentially and simultaneously transact a plurality of different services via this connection. All of the nodes connected in the data transmission must process the data stream in accordance with the quality of service profile specified by means of the technical transmission parameters.

An example for the use of this method is the "UMTS" $3^{rd}$ generation wireless network in which the network nodes SGSN (serving GPRS support node) and GGSN (gateway GPRS support node) are involved in the core network and the nodes: radio network controller (RNC); and base station (NodeB), are involved in the RAN. In FIG. 1, the above-described procedure is outlined using the example of UMTS. The above-mentioned external decision/service nodes are not shown in FIG. 1.

By contrast with the current UMTS standard, in which the user data flow through all of the nodes shown, now an optimization is sought such that the SGSN only continues to be involved in the signaling, but not in the transmission of user data. The essential disadvantages of the above-described prior art approach are:

a) The agreement on the quality of service is carried out per connection (in accordance with the "bearer") instead of per "service flow" (in accordance with the services), as is actually required.

b) Even for this "bearer," there is no shared understanding between the CN and the RAN with regard to the quality of service properties since the CN and the RAN function independently.

c) In the negotiation of the quality of service profile, many technical parameters must be negotiated, which are of no use or else meaningless to either the desired service in general or the respective nodes involved in the negotiation.

d) The signaling between the involved nodes is very complex due, among other things, to the circumstances discussed in item c) above.

e) Although the UE is registered in the network, additional signaling is still required in order to initiate the data communication.

f) Usually, the components of the CN shown in FIG. 1 are connected to one another by means of a transport network (backbone) that is based on the Internet protocol (IP). It is not possible, however, to compare the quality of service of the bearer installed in the wireless network to that of the transport network nodes.

g) A subsequent change in the quality of service of an already existing connection, for example, when the UE is using other applications/services, essentially requires the same signaling described above.

h) With the parallel use of services among which it is necessary to distinguish with regard to the qualities of service, additional connections must be set up in order to differentiate among the qualities of service (see item a) above). The signaling required for this is comparable to the signaling described above in terms of sequence and complexity.

SUMMARY OF THE INVENTION

A purpose of the present invention is to create a method for guaranteeing the quality of services in packet-switching wireless networks that avoids the above-mentioned disadvantages and can be used in both present and future wireless networks.

It is assumed that the IP is used as the packet-switching technique, as is also the case in the above example of UMTS. The wireless network also has the basic differentiation between a radio network component, RAN, and a core network component, CN.

The disclosed embodiments eliminate the method deficiencies in the concept currently in use, which complicate and even prevent an achievement of the quality of service required for the telecommunications services being offered. The simplifications inherent in these embodiments significantly reduce the number of processing steps and amount of resources required to guarantee the quality of service. In addition, minimizing the required signaling achieves a quicker connection setup and a higher degree of effectiveness in the network.

BRIEF DESCRIPTION OF THE DRAWING

Embodiments of the invention will be explained in greater detail using the attached drawing figures that represent merely one method of implementation, wherein.

DETAILED DESCRIPTION OF THE PREFERRED EMBODIMENTS

Figure 1:
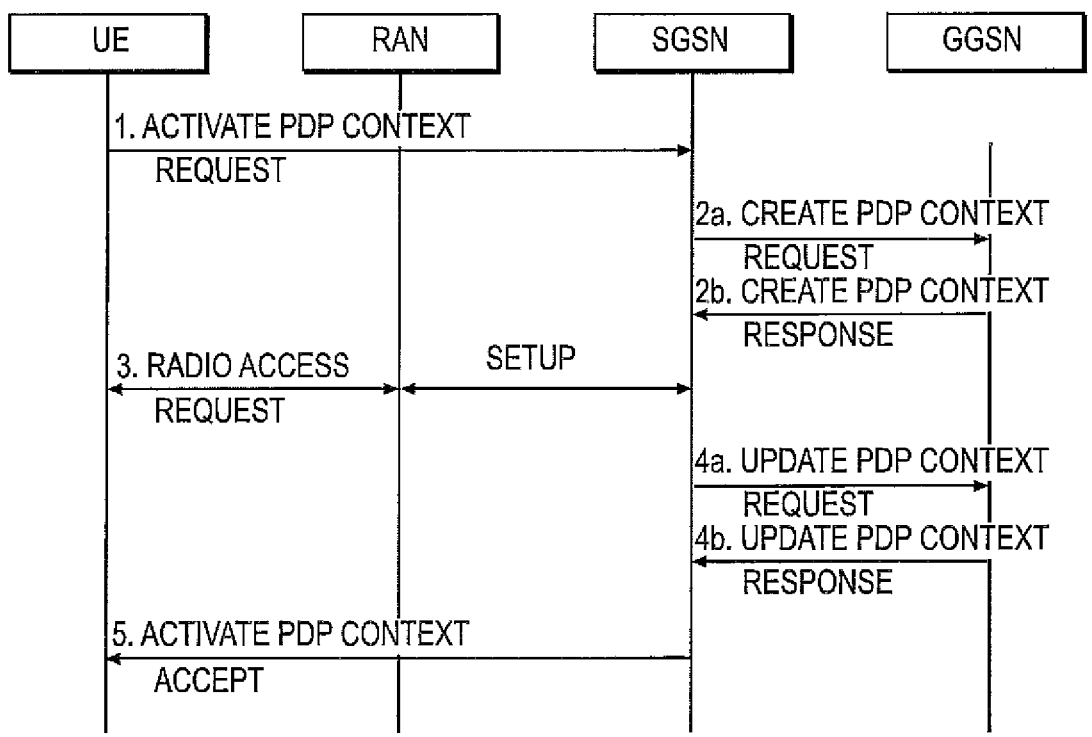
FIG. 1 shows the sequence for a connection setup according to the prior art.

The initial state is at first identical to that of the known embodiment. A terminal UE is situated in a cell and, after successful registration in the network, is available for data to be transmitted. Immediately after the registration or at a later time, a connection for the data transmission, including the quality of service to be used for it, is established. This can occur through the use of the method described here or as part of other (previously occurring) signaling between the UE and the network, thus eliminating a separate signaling for the connection setup (see item e) in the disadvantages of the embodiment currently in use). For example, the connection setup can be carried out as part of registering the UE onto the network or during the configuration of the UE for the IP protocol. At any rate, the method described here significantly reduces the amount of quality of service-related signaling.

In accordance with the division of the network into an RAN component and a CN component, a connection can be divided into a radio connection and a core network connection. The radio connection is administered by the RAN and is characterized by the following parameters:
- a radio flow identifier (RFI);
- a transport class label (TCL); and
- a TCL value-predetermined, radio network-specific description of the parameters of the radio connection, which the RAN uses to control the radio connection with regard to guaranteeing the quality of service.

The core network connection is essentially administered by the CN and is characterized by the following parameters:
- a CN flow identifier (CFI);
- a transport class label (TCL); and
- a TCL value-predetermined, core network-specific description of the parameters of the core network connection, which the CN uses to control the core network connection with regard to guaranteeing the quality of service.

The knowledge of the three parameters listed above is only required in the respective RAN or CN, while the TCL value is known in both the RAN and the CN. For the function of the method, however, it is irrelevant whether or not the above-mentioned identifiers/labels are known or even identical in the RAN and the CN. The RFI and CFI can be embodied so that they are unique only in combination with the identity of the UE.

Depending on the design of the system, the respective radio network-specific and core network-specific parameters can be derived indirectly from the TCL or can be explicitly indicated in part or in full in the TCL. In the event of a full or partial derivation of the specific parameters, the derivation is carried out on the basis of configurable node-specific rules. An essential defining characteristic of the method is comprised in that the RAN and the CN are each capable of changing specific parameters of the RAN/CN connection that they respectively administer, independently of each other and without corresponding signaling, provided that this is permitted within the limits of the predetermined TCL and the derivation rules that may be connected with it.

Each connection is also characterized by means of a packet filter that determines the properties of the IP control information (IP header) for the connection so that only packets that correspond to this packet filter are forwarded to the UE via this connection. In particular, the rule "all packets for this UE" can apply to a connection. The establishment of and/or changes to this packet filter for new/ongoing connections can be agreed upon between the UE and the CN or can be determined by the CN in another manner, for example, on the basis of the subscriber profile. The procedures required for this, however, are not a component of this quality of service method.

A) Transmission via an Existing Connection with a Constant Quality of Service

Packets that are transmitted via this connection to the UE ("downlink") (after the CN has assigned them to the connection with the aid of the packet filter) are identified with the labels CFI and TCL that apply to the connection. The RAN uses the CFI to forward the packet via the correspondingly established RAN connection, that is, the RAN maps the CFI on the RFI. The TCL indicates that the packet should be forwarded via the air interface with the quality of service established for the connection, it being unnecessary to transmit the TCL itself via the air interface.

Packets that are transmitted via this connection from the UE ("uplink") (after the UE has assigned them to the connection with the aid of internal means) are identified by the UE using the RFI allocated to this connection. The RAN uses the RFI to forward the packet via the correspondingly established CN connection, that is, the RAN maps the RFI on the CFI. In addition, the TCL that applies to this connection is added, which indicates that the packet should be forwarded via the core network with the quality of service established for the connection.

A variant of the above-mentioned method is the intermittent or total omission of the TCL since it has not changed in relation to the preceding packets while the quality of service has remained the same.

Packets that are sent or received via this connection to and from the UE can be encrypted previously on the RAN connection or CN connection or can be continuously encrypted from the CN to the UE. Encryption from the UE to the external target is also possible. Optimizations of the transport volume such as IP header compression are also possible.

Figure 2:
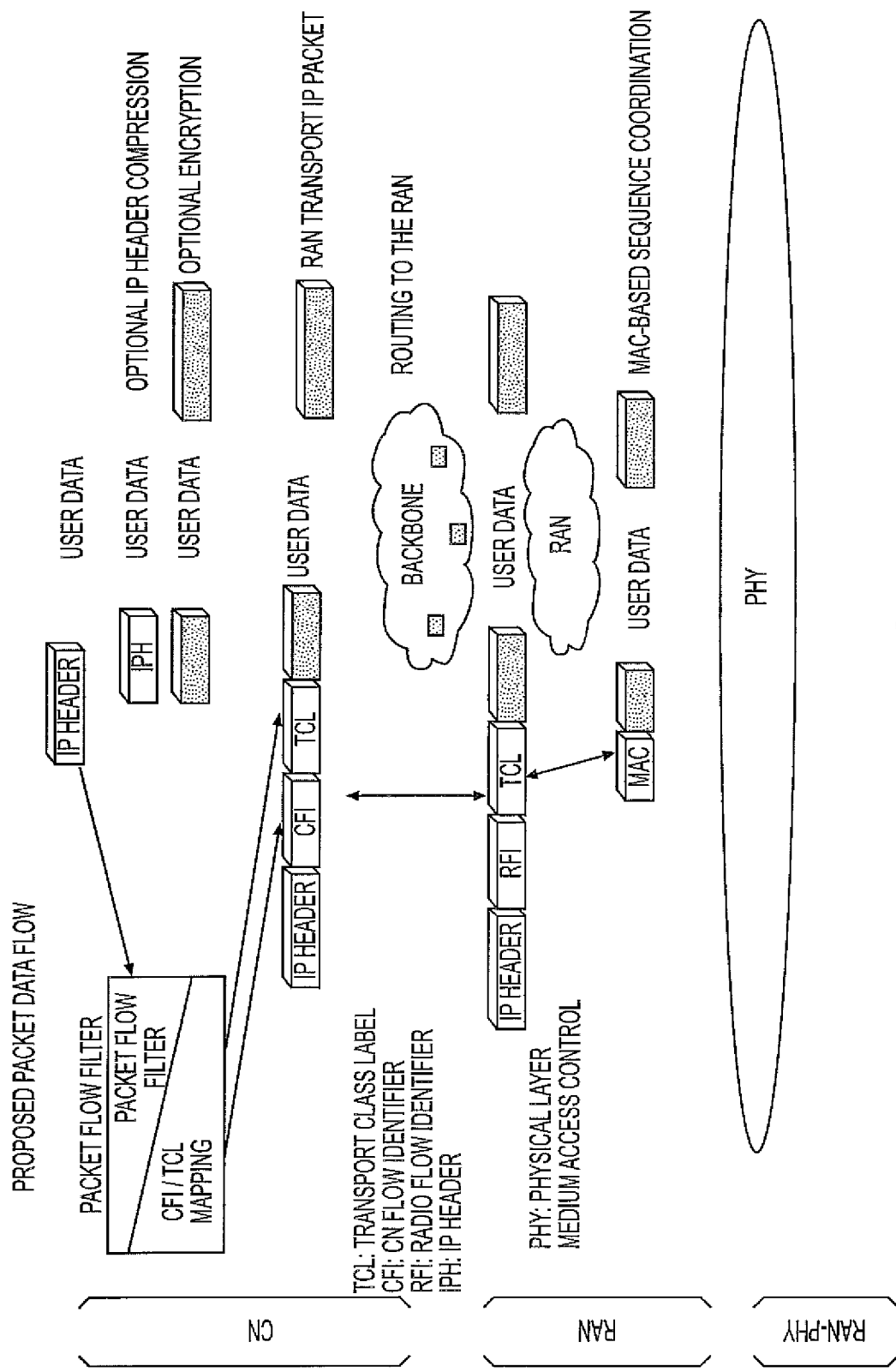
FIG. 2 shows the sequence for a connection setup according to the invention.

FIG. 2 schematically depicts the above-described sequence of the data transmission via the existing connection.

B) Transmission via an Existing Connection with a Change to the Quality of Service With an existing connection, a determination is made that the agreed-upon quality of service is not commensurate with (is too high/too low for) the service/purpose for which the connection is being used or that previously allocated/requested resources are no longer available or continue to be available. The change in the quality of service of the connection is then prompted by the node (UE, RAN, CN) that has determined the above-mentioned reason for the change.

B1) Change in the Quality of Service Prompted by the UE

The UE determines that it no longer requires the previously agreed-upon quality of service or that a service should proceed using a higher quality of service. It therefore requests a corresponding decrease or increase in the quality of service. This happens in the following sequence:

1. The UE asks the RAN for a change in the radio network-specific parameters of the connection in a way that cannot be reconciled with the existing TCL. In order to transmit this request, it may be necessary to establish a radio signaling connection ahead of time.
2. The RAN determines the TCL that is appropriate to the change in the radio connection.
3. The RAN sends the (uplink) packets of this connection, marked with the new TCL, to the CN. If the omission of the TCL, as described in A), is used, then at least one packet must be sent with the changed TCL. To ensure that the new TCL is received by the CN, it is also possible for the new TCL to be added to a plurality of packets in series or to packets sent at certain intervals. If there is no user data at this point, then it is alternatively possible for empty packets marked with the new TCL to be sent via the connection.
4. The core network-specific connection parameters required for the new TCL are determined in the CN.
5. The availability of the required resources is checked:
   a) if the result of the above-mentioned test is affirmative, then the new TCL is allocated to the connection (which is identified by the CFI),
   b) otherwise, the quality of service is reduced on the basis of the resources actually available and a TCL corresponding to this quality of service is allocated to the connection (this can be the "old" TCLI). This test can be omitted if the quality of service is to be reduced.
6. If a new TCL was allocated in the CN, then the permissibility of the new TCL for the connection to the UE can optionally be checked as a function of other information, for example, the subscriber profile. External decision or service nodes can be included in this as needed. This step can be omitted if the quality of service is to be reduced.
7. The CN then adds the TCL determined above to the downlink packets of this connection. If the technique alternative described in A) above of omitting the TCL is used, then at least one packet must be sent with the changed TCL. To ensure that the new TCL is received by the RAN, it is also possible for the new TCL to be added to a plurality of packets in series or to packets sent at certain intervals. If there is no user data at this point, then it is alternatively possible for empty packets marked with the new TCL to be sent via the connection.
8. If this is necessary and has not yet occurred, the parameters of the radio connection are adapted in accordance with the actual TCL predetermined in the above step 7:
   a) if the RAN and the UE have not yet made any change to the radio connection (see step 1 above), then this is now carried out in accordance with the actual TCL;
   b) changes that have already been made to the radio connection are adapted as needed in accordance with the actual TCL.

The depiction of the sequence above does not necessarily imply a chronological sequence.

B2) Change in the Quality of Service Prompted by the RAN

This change takes place, for example, when sufficient resources for maintaining the agreed-upon connection quality of service are no longer available in the RAN or withdrawn resources become available again after previous use. Consequently, the RAN prompts a decrease or increase in the quality of service. In this case, the sequence is identical to the sequence described in B1), except for the fact that the change to the radio connection in step 1 here originates not from the UE as in B1), but from the RAN.

The depiction of the sequence also does not necessarily imply a chronological sequence.

B3) Change in the Quality of Service Prompted by the CN

This change takes place, for example, when sufficient resources for maintaining the agreed-upon connection quality of service are no longer available in the CN or withdrawn resources become available again after previous use. It can also be prompted when the CN determines that the previously agreed-upon quality of service is no longer required or that a service should proceed using a higher quality of service. A change of the existing connection can also be prompted through communication of the CN with external decision or service nodes.

Consequently, the CN prompts a decrease or increase in the quality of service. In this case, the sequence is essentially identical to the sequence described in B1), except for the fact that the individual steps are carried out in a correspondingly reversed sequence, starting from the CN. It is consequently possible that the requested resources are not available in the RAN. To this extent, the RAN can send back a TCL, which differs from the one indicated by the CN, in the uplink.

Again, the depiction of the sequence does not necessarily imply a chronological sequence.

C) Establishment of Connections with a Determination of the Quality of Service

A UE or a UPE determines the need for setting up a (new) connection with a given quality of service. In the first connection, this can occur, for example, in the course of registering onto the network or other signaling, as described at the beginning, that is, with a procedure that does not depend on the embodiment described here.

C1) Establishment of the First Connection by the UE

Alternatively, the UE can separately prompt the establishment of a connection so that communication is even possible. The UE has then received the necessary authentication, identification, and communication parameters during the registration process. The connection setup then occurs in the following sequence.

1. Following the method described in B1), item 1, the UE asks the RAN for resources for a radio network connection. In order to transmit this request, it may be necessary to establish a radio signaling connection ahead of time.
2. The UE and the RAN come to an agreement, as already demonstrated in B), on the radio connection-specific parameters of the connection in accordance with the guidelines established in the RAN for the setup of new connections. The RAN determines the TCL that is appropriate to this radio connection and establishes an RFI for the connection.
3. The RAN sends the CN one or more uplink packet(s) marked with the new TCL and
   a) with a special CFI, which the CN interprets as a request for a new connection,
   b) with the UE identification parameters allocated in the registration to the required degree.

It is also possible to combine a) and b), for example if, as already explained at the beginning, the CFI is rendered unique by means of the UE identity. In this case, therefore, a valid CFI for the connection has already been established.
4. The CN generates the CFI to be used for the new connection or uses the already unique CFI and, as described in B), establishes the actual TCL. In this case, it can optionally reduce the TCL requested by the RAN (for example, due to resource bottlenecks, local guidelines, or limitations in the subscriber profile).
5. The CN sends the RAN one or more downlink packets with the established TCL, the valid CFI for the connection, and separately if necessary, the UE identification parameters
6. If needed, an additional adaptation of the radio connection between the RAN and the UE takes place. This establishes the connection.
7. The configuration of the UE with the required IP parameters (for example, IP address) takes place either by means of the above-mentioned steps or in a separate procedure.
8. The announcement and authentication of the UE in the CN and its testing take place either by means of the above-mentioned steps or in a separate procedure. In this case, it is also possible, as described in B), for a check as to the permissibility of the TCL to be carried out on the basis of subscriber data.
9. The separate procedures mentioned in steps 7 and 8 above are not components of the quality of service method being presented here.
10. The packet filter that is applicable to this first connection can implicitly be established as "all packets." If a different packet filter is desired so that only specific packets that correspond to this packet filter are transmitted via this connection, then the establishment of the packet filter is carried out as described in C2), step 6.
11. Modifications with regard to the quality of service of the connection that is now established can be carried out as described in B).

C2) Establishment of Additional Connections by the UE

This can take place in a fashion identical to the establishment of the first connection. Alternatively, however, it is also possible to use an already existing connection in order to request the new connection; it is possible to embed the new request into user data packets of the existing connection and to simplify or avoid reauthentication. This happens in the following sequence.
1. In the known fashion, the UE asks the RAN for resources for the new radio connection, in the process of which the radio connection parameters, the corresponding TCL, and a new RFI are determined.
2. In the uplink of an existing connection, the RAN adds to one or more packets the desired TCL and the CFI, which is established as described in C1), step 3. If there is no user data for the connection at this point, then it is alternatively possible for empty packets marked with the new TCL to be sent via the connection.
3. The already described procedures in the CN are carried out and the CN sends the final TCL and CFI in the downlink:
   a) embedded in an optionally empty packet of an existing connection;
   b) as described in C1), step 5, that is, already in the form of a new connection.
4. If necessary, an additional adaptation of the radio connection between the RAN and the UE takes place. This establishes the new connection.
5. The UE can use the same IP address for this connection as for another connection or can also use a different address. The mechanism that serves to determine the address to be used is not a component of this quality of service method.
6. It is also necessary to establish which packet filter is to be used for this connection so that the corresponding packets in the downlink are transmitted via this connection. This is agreed upon between the UE and the CN by means of mechanisms that lie beyond the scope of the quality of service method described here.
7. Independent of step 6 above, the UE could already send data via the new connection. If so desired, the CN can discard these data provided that there is no valid packet filter for the connection. Alternatively, the CN could also use the uplink packets as a basis for implicitly deriving the configuration for the (downlink) packet filters, including a possibly new IP address of the UE for this connection.
8. The quality of service of the new connection can be changed at any time with the methods described in B). In this case, a change could also be prompted by the fact that the connection is not being used in accordance with the agreed-upon quality of service or the fact that no packet filter has yet been established after a certain amount of time.

C3) Establishment of the First Connection by the CN

The CN can prompt this procedure, for example, if the IP address of the UE has been established or if a packet destined for the IP address of the UE arrives, but a connection does not yet exist. The sequence of this is analogous to the one in C1), but is correspondingly reversed.

The CN can also initiate the setup of a new connection as described here if a packet for a UE arrives for which the existing connections to this UE do not have an appropriate packet filter. Alternatively, it is also possible to change the packet filter of an existing connection to this UE. By contrast with the connection setup, the negotiation of the packet filter between the CN and the UE is not a component of the quality of service method being presented here.

C4) Establishment of Other Connections by the CN

The CN can prompt this procedure, for example, if packets arrive for a UE and there is no connection to the UE appropriate to the quality of service. In lieu of a modification to an existing connection, it can be useful here to set up a new connection, particularly if the packets to be transmitted via the new connection can be separated from the other packets in a useful fashion by means of a packet filter. A prompting to set up the new connection can also arise through communication of the CN with external decision or service nodes.

The sequence of this is analogous to the one in C2), but is correspondingly reversed.

D) Termination of an Existing Connection

This can be prompted by the UE, the RAN, or the CN, possibly also based on signaling with external decision or service nodes.

Regardless of which entity initiates the termination of the connection, the UE, the RAN, or the CN:
  the termination of the radio connection occurs by means of signaling between the RAN and the UE;
  the termination of the core network connection occurs by means of the mechanism described in B), in which the TCL is set to a special value that the RAN and the CN interpret as "connection termination."

The RAN and the CN then deactivate all resources and settings allocated to the connection. This may require a prior signaling between the UE and the CN, for example, through a logging off/resetting of the packet filter that applies to the connection.

The radio access network, RAN, and the core network, CN, use the quality of service data represented in this method, independently of each other and without signaling of the individual parameters, in order to assure the transmission of packets in the uplink and downlink in accordance with the quality of service. This is carried out exclusively on the basis of local settings configured for the individual TCLs. This achieves a decisive reduction in complexity as compared to the method currently in use. Further simplifications are achieved by the above-demonstrated combination of different tasks with one another or with already existing data transmission.

Examples for networks on which the method can be used:
$3^{rd}$ generation GSM wireless networks in which the core network is composed of the nodes SGSN and GGSN and the RAN is composed of the nodes BTS and BSC;
$3^{rd}$ generation UMTS wireless networks in which the core network is composed of the nodes SGSN and GGSN and the RAN is composed of the nodes NodeB and RNC; and
wireless networks of the further development of the $3^{rd}$ generation, currently undergoing standardization in 3 GPP under the working titles "SAE" and "LTE." In this case, the core network is composed of the nodes MME and UPE and the RAN is composed of the nodes eNodeB and possibly also central signaling nodes.

Variants of the demonstrated method with regard to including the quality of service in the backbone between the RAN and the CN and in the external network, include:
diffserv in the backbone;
diffserv on Gi; and
dito intserv.

What is claimed is:

1. A method for guaranteeing quality of services in packet-switching wireless networks having a core network (CN) and a radio access network (RAN), the method comprising the steps of:
   (a) determining a quality of service of a packet-oriented connection based on quality of service data; and
   (b) using the quality of service data by the RAN and the CN independently of each other and without signaling of any of individual RAN-specific parameters to the CN and CN-specific parameters to the RAN and data from which said individual parameters can be derived in order to assure a transmission of packets in the connection in accordance with the quality of service;
   wherein step (b) is carried out exclusively on the basis of local settings configured for individual transport class labels (TCLs).

2. The method recited in claim 1, and further comprising deriving the respective RAN-specific and CN-specific parameters indirectly from transport class label (TCL) or the parameters are explicitly indicated in part or in full in the TCL and, in the event of a full or partial derivation of the specific parameters, carrying out said full or partial derivation on the basis of configurable node-specific rules.

3. The method recited in claim 1, wherein the RAN and the CN are each capable of changing specific parameters of the RAN/CN connection that the RAN and the CN respectively administer, independently of each other and without corresponding signaling, provided that the administering is permitted within the limits of predetermined TCL and derivation rules that may be connected with the RAN and the CN.

4. The method recited in claim 1, and further comprising determining, with an existing connection, that the agreed-upon quality of service is not commensurate with the service/purpose for which the existing connection is being used or that previously allocated/requested resources are no longer available or continue to be available and prompting a change in the quality of service of the existing connection by a node, selected from the RAN, the CN, and a UE (user equipment), that has determined the above-mentioned reason for the change.

5. The method recited in claim 1, and further comprising determining, with an existing connection, that the agreed-upon quality of service is not commensurate with the service/purpose for which the existing connection is being used or that previously allocated/requested resources are no longer available or continue to be available and prompting a change in the quality of service of the existing connection by a node, selected from the RAN, the CN, and a UE (user equipment), that has determined the above-mentioned reason for the change.

6. The method recited in claim 2, wherein the connection is established as a part of registering a terminal of a user equipment (UE) in the network or during configuration of the UE for an internet protocol (IP).

7. The method recited in claim 1, wherein the RAN and the CN are each capable of changing specific parameters of the RAN/CN connection that the RAN and the CN respectively administer, independently of each other and without corresponding signaling, provided that the administering is permitted within the limits of predetermined TCL and derivation rules that may be connected with the RAN and the CN.

8. The method recited in claim 1, and further comprising determining, with an existing connection, that the agreed-upon quality of service is not commensurate with the service/Purpose for which the existing connection is being used or that previously allocated/requested resources are no longer available or continue to be available and prompting a change in the quality of service of the existing connection by a node, selected from the RAN, the CN, and a UE (user equipment), that has determined the above-mentioned reason for the change.

9. The method recited in claim 7, wherein the connection established as a part of registering a terminal of a user equipment (UE) in the network or during configuration of the UE for an internet protocol (IP).

10. The method recited in claim 1, and further comprising determining, with an existing connection, that the agreed-upon quality of service is not commensurate with the service/purpose for which the existing connection is being used or that previously allocated/requested resources are no longer available or continue to be available and prompting a change in the quality of service of the existing connection by a node, selected from the RAN, the CN, and a UE (user equipment), that has determined the above-mentioned reason for the change.

11. The method recited in claim 10, wherein the change in the quality of service is prompted by the UE.

12. The method recited in claim 10, wherein the change in the quality of service is prompted by the RAN.

13. The method recited in claim 10, wherein the change in the quality of service is prompted by the CN.

14. The method recited in claim 10, wherein the connection is established as a part of registering a terminal of a user equipment (UE) in the network or during configuration of the UE for an internet protocol (IP).

15. The method recited in claim 1, wherein the connection is established as a part of registering a terminal of a user equipment (UE) in the network or during configuration of the UE for an internet protocol (IP).

* * * * *